(12) United States Patent  (10) Patent No.: US 7,641,588 B2
Thomson et al.  (45) Date of Patent: Jan. 5, 2010

(54) CVT SYSTEM HAVING DISCRETE SELECTABLE SPEED RANGES

(75) Inventors: Norval P. Thomson, Dunlap, IL (US); Alberto Martinez, Jr., Lisle, IL (US)

(73) Assignee: Caterpillar Inc., Peoria, IL (US)

( * ) Notice: Subject to any disclaimer, the term of this patent is extended or adjusted under 35 U.S.C. 154(b) by 424 days.

(21) Appl. No.: 11/700,196

(22) Filed: Jan. 31, 2007

(65) Prior Publication Data

US 2008/0183358 A1  Jul. 31, 2008

(51) Int. Cl.
*B60W 10/04*  (2006.01)
(52) U.S. Cl. ........................................ 477/108
(58) Field of Classification Search .................. 477/42, 477/37, 108; 180/170, 175, 176; 701/95
See application file for complete search history.

(56) References Cited

U.S. PATENT DOCUMENTS

| 4,721,018 | A |   | 1/1988  | Harada et al. |
|-----------|---|---|---------|---------------|
| 4,740,898 | A |   | 4/1988  | McKee et al. |
| 4,864,894 | A |   | 9/1989  | Falzoni |
| 5,142,928 | A |   | 9/1992  | Buti et al. |
| 5,406,483 | A |   | 4/1995  | Kallis et al. |
| 5,520,588 | A |   | 5/1996  | Hall, III |
| 5,520,591 | A |   | 5/1996  | Hohnstein |
| 5,527,232 | A |   | 6/1996  | Seidel et al. |
| 5,553,453 | A | * | 9/1996  | Coutant et al. ............. 60/327 |
| 5,560,203 | A |   | 10/1996 | Pollman |
| 5,890,991 | A |   | 4/1999  | Sakakiyama |
| 5,924,955 | A |   | 7/1999  | Ishii et al. |
| 6,080,074 | A |   | 6/2000  | Ulbrich et al. |
| 6,157,884 | A |   | 12/2000 | Narita et al. |
| 6,183,390 | B1 |  | 2/2001  | Koga et al. |
| 6,246,940 | B1 |  | 6/2001  | Ochiai et al. |
| 6,247,378 | B1 |  | 6/2001  | Newendorp et al. |

(Continued)

FOREIGN PATENT DOCUMENTS

DE  101 61 900  8/2002

(Continued)

OTHER PUBLICATIONS

Michael D. Anderson et al., Copending U.S. Appl. No. 11/316,894, filed Dec. 27, 2005 (41 pages).

(Continued)

*Primary Examiner*—Dirk Wright
(74) *Attorney, Agent, or Firm*—Finnegan, Henderson, Farabow, Garrett & Dunner (57) ABSTRACT

A continuously variable transmission control system is disclosed. The control system has a first operator input device to receive operator input and produce a corresponding first signal indicative of a selected one of a plurality of available predetermined discrete machine travel speed ranges. The control system also has a second operator input device to receive operator input and produce a corresponding second signal indicative of desired machine travel. The control system also has a power source operatively coupled to drive a continuously-variable transmission, and a controller configured to regulate at least one of an output of the power source and an output of the continuously variable transmission in response to the first and second signals such that an actual machine travel speed remains within the selected one of the plurality of predetermined discrete machine travel speed ranges.

20 Claims, 4 Drawing Sheets

U.S. PATENT DOCUMENTS

| | | | |
|---|---|---|---|
| 6,311,118 B1 * | 10/2001 | Ito et al. ............... | 701/95 |
| 6,350,216 B1 | 2/2002 | Speicher et al. | |
| 6,428,438 B1 | 8/2002 | Bowen | |
| 6,553,302 B2 | 4/2003 | Goodnight et al. | |
| 6,622,075 B1 | 9/2003 | Reuschel et al. | |
| 6,633,805 B2 | 10/2003 | Burgart et al. | |
| 6,671,602 B1 | 12/2003 | Speicher et al. | |
| 6,766,231 B2 | 7/2004 | Nakagawa et al. | |
| 6,845,684 B2 | 1/2005 | Inaba et al. | |
| 6,961,646 B2 | 11/2005 | Soliman et al. | |
| 7,076,335 B2 | 7/2006 | Seeman | |
| 7,107,135 B2 | 9/2006 | Soliman et al. | |
| 2006/0065467 A1 | 3/2006 | Schuh | |
| 2007/0082786 A1 | 4/2007 | Strashny et al. | |
| 2009/0088295 A1 * | 4/2009 | Dahl et al. ............ | 477/107 |

FOREIGN PATENT DOCUMENTS

| | | |
|---|---|---|
| EP | 0 270 197 | 6/1988 |
| EP | 1 172 248 | 1/2002 |
| EP | 1277610 | 1/2003 |
| JP | 01153862 | 6/1989 |
| JP | 2002168339 A | 6/2002 |
| JP | 2005126020 A | 5/2005 |

OTHER PUBLICATIONS

Office Action issued in Copending U.S. Appl. No. 11/316,894, mailed Jan. 9, 2008.

Amendment filed in response to Office Action issued in Copending U.S. Appl. No. 11/316,894, filed May, 2008.

Igor Strashny et al., Copending U.S. Appl. No. 11/543,941, filed Oct. 6, 2006 (37 pages).

Ibamoto et al., "Advanced Technology of Transmission Control," Hitachi Review, vol. 39, No. 5, Oct. 1, 1990, pp. 307-312, XP000219781 ISSN: 0018-277X.

Takeshi et al., Abstract of Japanese Publication No. JP 01153862, dated Jun. 16, 1989 (1 page).

* cited by examiner

CVT SYSTEM HAVING DISCRETE SELECTABLE SPEED RANGES

TECHNICAL FIELD

The present disclosure is directed to a transmission system, particularly a CVT transmission system having discrete selectable speed ranges.

BACKGROUND

Machines such as, for example, wheel loaders, dozers, backhoes, dump trucks, and other heavy equipment are used to perform many tasks. To effectively perform these tasks, the machines require an engine that provides significant torque through a transmission to one or more ground engaging devices. Such machines usually include conventional manual or automatic transmissions having a discrete number of step-changed output ratios (gears) to control the speed and torque of the ground engaging devices. The output ratios correspond to travel speed ranges, each having a predefined maximum travel speed. For example, an operator can place a wheel loader in a second of available gears and, when the accelerator pedal is fully depressed, the wheel loader may accelerate to a maximum travel speed of about 8 mph.

Consequently, operators are accustomed to using certain gears for accomplishing specific tasks. For example, a wheel loader operator may know that the speed range of second gear is appropriate for effectively dozing a mound of earth of a given size. Likewise, the operator may know that the speed range of third gear is appropriate for safely traveling across a worksite with a full load. Additionally, the speed range associated with each gear of a given machine type (e.g., wheel loader) is fairly standard across different machines and different manufacturers. Therefore, operators have become comfortable using specific speed ranges for specific tasks, despite using a variety of machines.

Recently, however, conventional manual and automatic transmissions are being replaced by continuously variable transmissions (CVT). A CVT provides an infinitely variable torque-to-speed output ratio within its overall range. Although a CVT improves engine efficiency, it does not behave in the manner discussed above with respect to the discrete speed ranges of earlier transmission types. Specifically, fully depressing the accelerator pedal in a machine with a CVT will cause it to accelerate to a maximum possible speed, as the transmission uses its full range of output ratios, and the engine output will increase to a maximum possible speed. Therefore, operators must hold the accelerator pedal in an intermediate position in order to travel at a desired speed less than the maximum. This proves very difficult in rough terrain common to many worksites and causes undue operator fatigue. Accordingly, there is a need to limit the travel speed of a machine with a CVT in an alternative manner.

One such method of machine control is described in U.S. Pat. No. 6,247,378 (the '378 patent) by Newendorop et al., issued on Jun. 19, 2001. The '378 patent describes a control system for a machine having an electric CVT. Specifically, the control system is described as having a control lever disposed within a guide slot, and one or more speed adjustors for setting a maximum speed limit. The system allows an operator to slide the control lever to a set position corresponding to a desired speed limit, and to activate the speed adjustors to either set or change the speed limit. Accordingly, the machine travel speed is restricted between zero and the set speed limit.

Although the '378 patent may alleviate some of the aforementioned problems associated with travel speeds of a machine with a CVT, it does not offer discrete, selectable speed ranges, which correspond to the speed ranges of the earlier step-change transmissions. As discussed above, the operator may be more cognizant of which of the gears offers an appropriate speed range, rather than what specific speed is appropriate (e.g., 5 mph). In fact, an operator may be unaware of the speed appropriate for accomplishing the specific task. This lack of awareness may occur because an operator is usually unavailable to watch the speedometer during completion of a work task, and, therefore, would be unable to easily identify and correctly select a specific maximum speed.

The system of the present disclosure solves one or more of the problems set forth above.

SUMMARY OF THE INVENTION

One aspect of the present disclosure is directed to a transmission control system. The control system includes a first operator input device to receive operator input and produce a corresponding first signal indicative of a selected one of a plurality of available predetermined discrete machine travel speed ranges. The control system also includes a second operator input device to receive operator input and produce a corresponding second signal indicative of desired machine travel. The control system further includes a power source operatively coupled to drive a continuously-variable transmission, and a controller configured to regulate at least one of an output of the power source and an output of the transmission in response to the first and second signals such that an actual machine travel speed remains within the selected one of the plurality of available predetermined discrete machine travel speed ranges.

Another aspect of the present disclosure is directed to a method of controlling machine travel speed. In particular, the method includes transmitting power output through a continuously variable transmission to propel a machine. The method also includes receiving a first signal indicative of a selected one of a plurality of available predetermined discrete travel speed ranges, receiving a second signal indicative of desired machine travel, and regulating at least one of the power output and an output of the continuously variable transmission in response to the first and second signals such that an actual machine travel speed remains within the selected one of the plurality of available predetermined discrete machine travel speed ranges.

DETAILED DESCRIPTION

Figure 1:
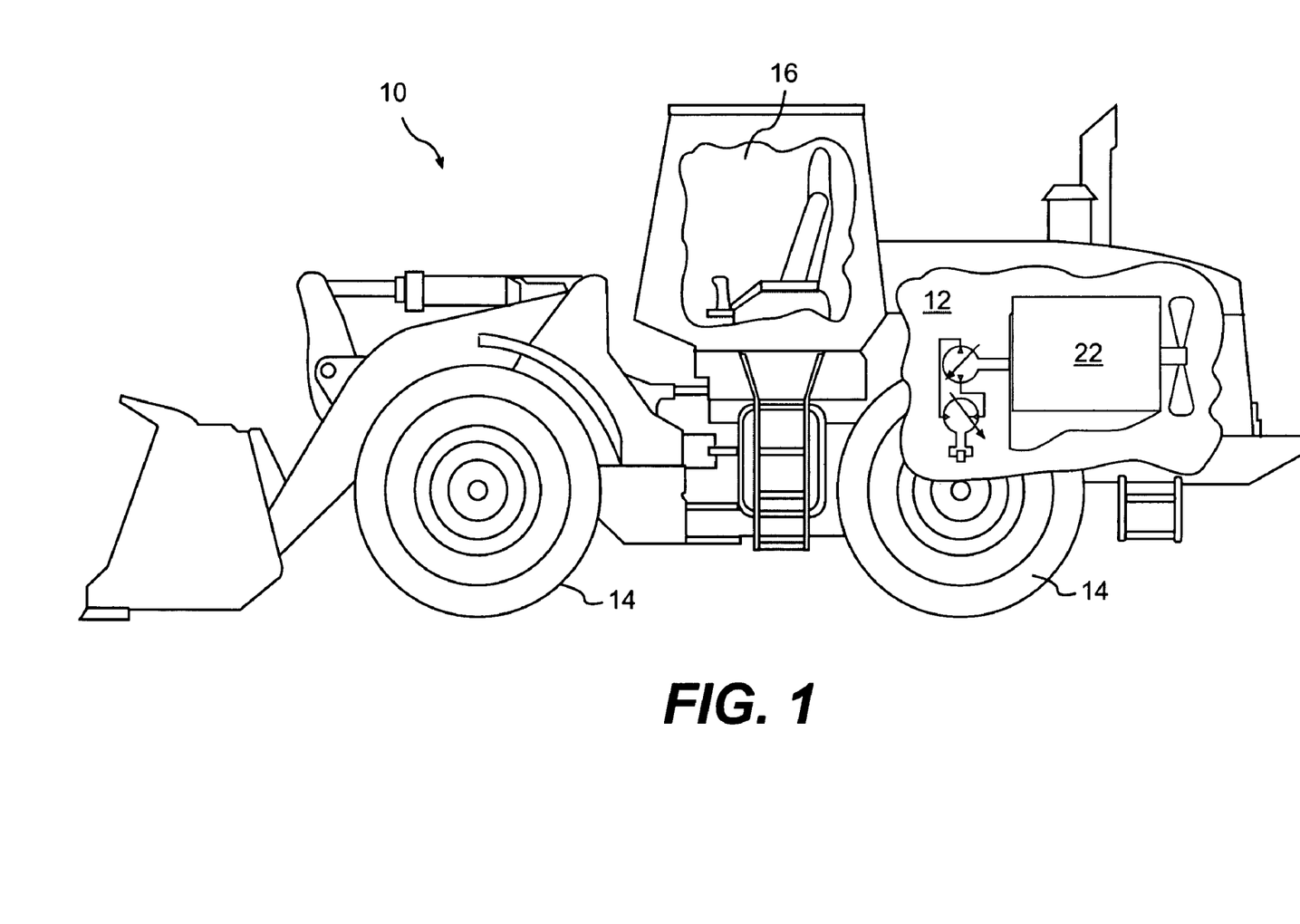
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, or any other industry known in the art. For example, machine 10 may embody a mobile machine such as the wheel loader depicted in FIG. 1, an on- or off-highway haul truck, or any other type of mobile machine known in the art. Machine 10 may include an operator station 12, from which operator control of machine 10 may be affected. Machine 10 may also include a power train 14 operatively connected to one or more driven and/or steerable traction devices 16, such as, for example, wheels, tracks, or belts located on each side of machine 10 (only one side shown).

Figure 2:
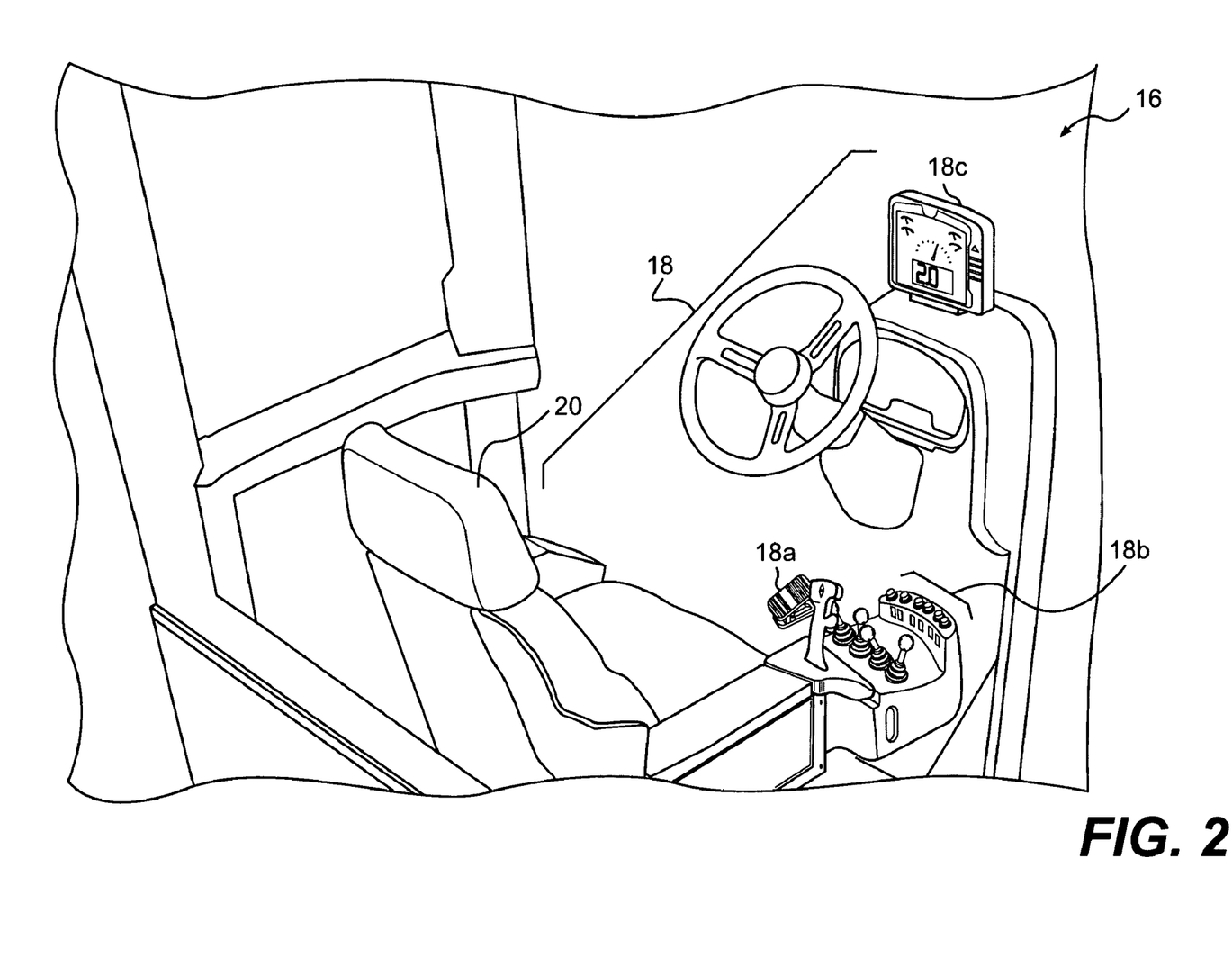
FIG. 2 is a pictorial illustration of an exemplary disclosed operator station for use with the machine of FIG. 1.

As illustrated in FIG. 2, operator station 12 may include an operator interface 18 proximate a seat 20 for generating machine command signals indicative of desired machine maneuvers and/or functions in response to operator input. In one embodiment, operator input devices 18 may include a throttle device, such as a foot pedal 18a. As an operator manipulates foot pedal 18a, the operator may expect and affect a corresponding machine travel movement, such as, for example, acceleration and/or deceleration. For example, foot pedal 18a may define a path between a minimum displacement position and a maximum displacement position. A sensor 21 (FIG. 3), such as a switch, potentiometer, and/or signal generator, may be associated with foot pedal 18a to sense an amount of displacement (e.g., an angle of depression) and generate a corresponding displacement signal in response.

Operator interface 18 may also include a speed range selector 18b, which may comprise, for example, one or more levers, buttons, switches, knobs, wheels, keypads, touchpads, control panels, etc., for receiving operator input indicative of a selected speed range from among a plurality of available predetermined discrete speed ranges. For example, selector 18b may embody a switch movable through a range of discrete positions, from a minimum speed range to a maximum speed range (e.g., "1", "2", "3", and "4"). Alternatively, selector 18b may comprise a plurality of buttons, each button corresponding to one of the available ranges. Selector 18b may generate a corresponding signal indicative of the selected speed range.

Interface 18 may further include a monitor 18c to display parameters indicating certain aspects of machine status and/or performance for operator acknowledgment. Monitor 18c may be one of a liquid crystal display, a CRT, a PDA, a plasma display, a touch-screen, a monitor, a portable hand-held device, or any other type of display known in the art. It is to be appreciated that monitor 18c may also receive operator input by way of a touch-screen, software keys, and the like.

Figure 3:
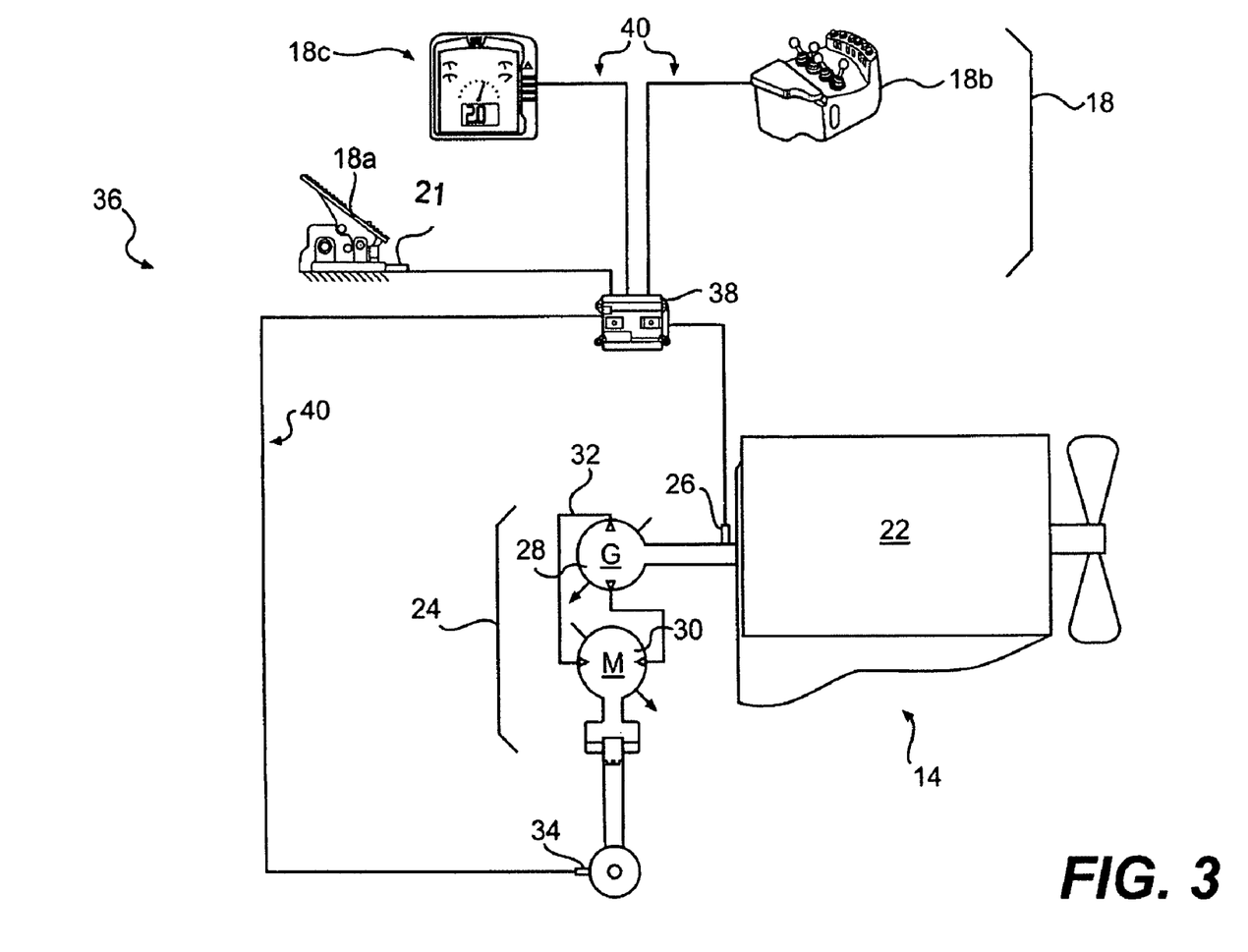
FIG. 3 is a diagrammatic illustration of an exemplary disclosed control system for use with the operator station of FIG. 2.

As illustrated in FIG. 3, power train 14 may be an integral package that generates and transmits power to traction devices 16. In particular, power train 14 may include a power source 22 configured to generate a power output, and at least one transmission unit 24 operatively coupled thereto to receive, convert, and/or transmit the power output in a useful manner to traction devices 16 (FIG. 1).

Power source 22 may comprise an internal combustion engine having multiple subsystems that cooperate to produce mechanical or electrical power output. For the purposes of this disclosure, power source 22 is depicted and described as a four-stroke diesel engine. It is to be appreciated, however, that power source 22 may be any other type of internal combustion engine such as, for example, a gasoline or a gaseous fuel-powered engine. The subsystems included within power source 22 may include, for example, a fuel system, an air induction system, an exhaust system, a lubrication system, a cooling system, or any other appropriate system.

A sensor 26 may be associated with power source 22 to sense an output speed thereof. For example, sensor 26 may embody a magnetic pickup-type sensor in communication with a magnet embedded within a rotational component of power source 22, such as a crankshaft, flywheel, or the like. During operation of power source 22, sensor 26 may detect a rotating magnetic field produced by the embedded magnet and generate a corresponding feedback signal in response. As such, in one aspect, the signal may have a frequency component directly proportional to the output speed of power source 22.

Referring to FIG. 3, transmission unit 24 may embody, for example, a continuously variable transmission (CVT). Transmission unit 24 may be any type of continuously variable transmission such as, for example, an electric CVT, a mechanical CVT, a hydraulic CVT, a hydro-mechanical CVT, or other configuration apparent to one skilled in the art. A CVT generally has an infinite number of available torque-to-speed output ratios within its continuous overall range. Generally, a CVT may include a driving element 28 coupled to receive the output of power source 22. Driving element 28 may be operatively coupled to power a driven element 30, which may, in turn, drive traction devices 16 and propel machine 10. One or more operational characteristics of driving element 28 and/or driven element 30 may be responsively controlled to affect a continuously variable torque-to-speed output ratio.

In the exemplary electric CVT shown in FIG. 3, driving element 28 may be a generator, such as a three-phase permanent magnet alternating field-type generator, and driven element 30 may be an electric motor, such as permanent magnet alternating field-type motor configured to receive power from driving element 28. The generator of driving element 28 may be operably coupled to drive the motor of driven element 30 with electric current via power electronics 32 in response to a transmission command signal. In some situations, the motor of driven element 30 may alternatively drive the generator of driving element 28 in a reverse direction through power electronics 32.

Power electronics 32 may include generator associated components and motor associated components. For example, power electronics 32 may include one or more drive inverters (not shown) configured to invert three-phase alternating power to direct phase power and vice versa. The drive inverters may have various electrical elements including insulated gate bipolar transistors (IGBTs), microprocessors, capacitors, memory storage devices, and any other similar elements used for operating driving element 28 and driven element 30. Other components that may be associated with the drive inverter include power supply circuitry, signal conditioning circuitry, and solenoid driver circuitry, among others. In addition, power electronics 32 may include a generator heat sink (not shown), and a motor heat sink (not shown) in communication with driving and driven elements 28, 30, respectively. Each heat sink may absorb heat from their respective components of power electronics 32 and transfer this heat to a cooling system (not shown).

In another aspect, transmission unit 24 may embody a mechanical CVT (not shown), wherein driving element 28 and driven element 30 each comprise a variable diameter frictional pulley interconnected by a belt or other frictional component. The belt may be kept taut during operation by an opposing (i.e., outward) force applied between driving element 28 and driven element 30 by a resilient member, such as, for example, a loaded spring or an actuator. In such an arrangement, power electronics 32 may include one or more electromechanical actuators configured to vary the respective diameters of driving element 28 and driven element 30 in response to a CVT command signal. It is to be appreciated that the respective diameters thereof may vary inversely with one another in order to affect a change in the torque-to-speed output ratio of transmission unit 24.

In a further aspect, CVT 24 may embody a hydraulic CVT (not shown), comprising a variable-displacement pump 28 drivably connected to a motor 30 by way of a fluid-filled conduit. Motor 30 may complete a given number of rotations per volume of fluid displaced by pump 28. As such, the displacement of pump 28 (i.e., volume per stroke or rotation) may be continuously varied by power electronics 32 in response to a CVT command signal to affect a change in the torque-to-speed output ratio of CVT 24. Alternatively or additionally, a displacement of motor 30 may be similarly varied to affect a change in the torque-to-speed output ratio of CVT 24.

A sensor 34 may be associated with transmission unit 24 to sense a travel speed of machine 10. In one example, sensor 34 may embody a magnetic pickup type-sensor in communication with a magnet embedded within a rotational component of power train 14, such as a drive shaft. During operation of machine 10, sensor 34 may detect the rotating magnetic field produced by the magnet and generate a corresponding electrical signal in response thereto. As such, in one aspect, the electrical signal may include a frequency component directly proportional to the rotational output speed of transmission unit 24, and, by implication, the corresponding speed of traction devices 16 and/or travel speed of machine 10.

FIG. 3 also shows an exemplary control system 36, which may include a controller 38 in communication with interface 18, including foot pedal 18a, input devices 18b and monitor 18c; power source 22; and/or transmission unit 24. Controller 38 may receive feedback signals from interface 18 and/or generate machine command signals to, among other things, affect machine travel within disclosed operator-selected speed ranges.

Control system communications may be facilitated by communication links 40 and other suitable network architecture. Links 40 may include wired and/or wireless non-proprietary links and protocols, or proprietary links and protocols based on known industry standards, such as J1939, RS-232, RP1210, RS-422, RS-485, MODBUS, CAN, SAEJ1587, Bluetooth, the Internet, an intranet, 802.11b or g, or any other communication links and/or protocols known in the art. The network architecture may include, alone or in any desired combination, a telephone-based network (such as a PBX or POTS), a satellite-based network, a local area network (LAN), a wide area network (WAN), a dedicated intranet, the Internet, and/or any other suitable network architecture.

Controller 38 may include computer-readable memory, such as read-only memories (ROM), random-access memories (RAM), and/or flash memory; secondary storage device (s), such as a tape-drive and/or magnetic disk drive; a microprocessor(s) (CPU), and/or any other components for running the disclosed application. The microprocessor(s) may comprise any suitable combination of commercially-available or specially-constructed microprocessors for controlling system operations in response to operator input. As such, controller 38 may include machine instructions and/or data stored as hardware, software, and/or firmware within the memory, secondary storage device(s), and/or microprocessors. Various other circuits may be associated with controller 38, such as power supply circuitry, signal conditioning circuitry, solenoid driver circuitry, and other types of circuitry, if desired.

Controller 38 may include information associated with a plurality of selectable machine travel speed ranges, which may be implemented by controller 38 upon receipt of the selection signal generated by selector 18b. In one aspect, controller 38 may include a minimum speed and a maximum speed for each range. For example, speed ranges "1", "2", "3", and "4", may each have minimum speeds of 0 mph and maximum speeds of 4 mph, 8 mph, 12 mph, and 20 mph, respectively. In another embodiment, each speed range may have a minimum speed greater than 0 mph but less than the maximum speed. For example, speed ranges "1", "2", "3", and "4" may have the maximum speeds listed above, and minimum speeds of 0 mph, 1 mph, 3 mph, and 6 mph, respectively. In one embodiment, the minimum and maximum speeds of the selectable ranges may correspond with known travel speed ranges of common step change transmissions. However, it is to be appreciated that the minimum and maximum speeds of each range may be set to any desired value.

It is also contemplated that controller 38 may include information pertaining to selectable discrete incremental speed ranges. For example, speed range "0.5", may have a travel speed range 50% of that of speed range "1" (0 mph to 2 mph), while speed range "1.5" may have a travel speed range 50% greater than speed range "1" (0 mph to 6 mph). It is to be appreciated that selectable speed ranges of any desired increment (e.g., 0.1) may similarly be included in controller 38. The incremental speed ranges may be selected, for example, by positioning speed selector 18b in a desired incremental position. Upon selection, the travel speeds associated with the selected range may be directly calculated by controller 38 based on known machine specifications, and/or received or retrieved as predetermined data stored in the microprocessor (s), memory, and/or secondary storage device of controller 38.

Controller 38 may further include accelerator pedal "mapping" information for each of the plurality of available speed ranges. For example, pedal 18a may have a 20-degree rotational displacement path from a minimum to a maximum travel speed. As such, for speed range "2", pedal 18a may be mapped such that an actual machine travel speed within the 0 mph to 8 mph range is proportional to a displacement position of pedal 18a within the 20-degree displacement path. In other words, each degree of pedal displacement may correspond to 0.4 mph of actual machine travel speed, or a gain of 0.4.

As such, selected low ranges (e.g., "1" or "2") may have proportionally low gains, while selected high ranges (e.g., "3" or "4") may have proportionally high gains. For example, speed range "1" may have a maximum travel speed of 4 mph and a respective gain of 0.2 mph/degree of pedal actuation, while speed range "3" may have a maximum travel speed of 12 mph and a respective gain of 0.6 mph/degree of pedal actuation. In this manner, low incremental speed ranges may provide precise control over actual machine travel speed, which may be advantageous during, for example, completion of a work task around a delicate above-ground obstacle. Specifically, speed range "0.5" may have a gain of 0.1 mph/ degree of pedal actuation, and sudden, inadvertent manipulation of pedal 18b may not generate a large change in machine travel speed. The pedal mapping information may be directly calculated by controller 38 based on known machine specifications, and/or received or retrieved as predetermined data stored in the microprocessor(s), memory, and/or secondary storage device of controller 38.

In one embodiment, the operator may press selector button 18b corresponding to speed range "2". Upon receipt of the selection signal, controller 38 may cause monitor 18c to visually display the selected speed range "2" for operator acknowledgment. As shown in the exemplary embodiment of FIG. 4, the selected speed range may be displayed numerically on a virtual gear readout 42. However, it is to be appreciated that the speed range may alternatively or additionally be shown as an icon, symbol, and/or otherwise graphically indicated, if desired.

During subsequent machine operation, controller 38 may responsively regulate an output speed of power source 22, and/or a torque-to-speed output ratio of CVT 26 to limit actual machine travel speed to the selected range, while maintaining an efficient overall machine operating condition. In one aspect, controller 38 may communicate a command signal to power source to adjust fuel flow, air flow, and/or other parameters of source 22 to thereby regulate a speed and/or torque output. Similarly, controller 38 may provide a CVT command signal to power electronics 32 to adjust parameters of driving and/or driven elements 28, 30, and thereby regulate a torque to speed output ratio of CVT 24, such that a speed of machine 10 remains within the selected range. It should be noted that, based on changing machine loading and/or terrain variation, the output torque of power source 22 and/or CVT 24 may change, even though the output speed of CVT 24 may remain at the desired speed within the selected range.

For example, an operator may initiate an acceleration command by depressing pedal 18a, and sensor 21 may generate a corresponding real-time displacement signal indicating an extent to which pedal 18a is depressed. Controller 38 may then determine the angle of depression and multiply the angle by the gain factor associated with the selected speed range (discussed above) to determine a desired machine travel speed. Controller 38 may then communicate a real-time command signal to power source 22 and/or a real-time command signal to CVT 24 in response to the desired machine travel speed. Continuing with the example from above, if pedal 18a is fully depressed (i.e., full 20-degrees), controller 38 may determine that the operator wishes to travel at the full 8 mph permitted by range "2" (i.e., 0.4 degrees/mph×20 degrees=8 mph). As such, controller 38 may automatically adjust a real-time power source command signal and/or a real-time CVT command signal such that power source 22 reaches an optimum output speed (RPM) and machine 10 achieves an actual travel speed of 8 mph in an efficient manner.

Likewise, the operator may only partially depress pedal 18a, such as, for example, to 15 degrees. Continuing with the example from above, controller 38 may determine that the operator wishes to travel at 6 mph (i.e., 0.4 degrees/mph×15 degrees=6 mph). As such, controller 38 may adjust the real-time power source command signal and/or the real-time CVT command signal such that machine 10 achieves an actual travel speed of 6 mph in an efficient manner, as discussed above.

During acceleration, and/or steady machine travel, controller 38 may receive real-time feedback signals from sensors 26 and/or 34 indicating changes in machine loading due to environmental conditions. For example, machine 10 may encounter an incline while traveling across a worksite. Alternatively or additionally, the operator may be affecting tool movement by way of interface 18, which may increase the load on power source 22 during travel (i.e., power source 22 may drive hydraulics which may actuate movement of a machine tool). As such, power source sensor 26 may begin to indicate a slight decrease in the output speed (RPM) of power source 22, as the load on machine 10 increases. Alternatively or additionally, sensor 24 may begin to indicate a slight decrease in transmission output speed as traction devices 16, and by implication, machine travel speed, begin to slow in response to the increased load. In one aspect, detected frequency components in the feedback signals may begin to decrease. If the operator maintains pedal 18a in the same position (e.g., fully depressed as in the above example), controller 38 may determine that the operator wishes to maintain the 8 mph travel speed in spite of the increasing load. As such, controller 38 may determine, in response to the feedback signals, that the real-time power source command signal and/or the real-time CVT command signal should be updated.

For example, controller 38 may determine that a higher power source output speed and/or torque, and/or a lower toque-to-speed output ratio of CVT 24 may be required to maintain the desired travel speed of 8 mph. As such, controller 38 may adjust the power source control signal such that additional fuel and/or air flows to power source 22 to affect an increase in the output speed and/or torque thereof. Alternatively or additionally, controller 38 may adjust the CVT command signal such that the output speed thereof increases. In this manner, the desired travel speed of 8 mph may be efficiently maintained by controller 38 in spite of an increasing load. Additionally, unlike a counterpart machine employing a conventional transmission and control system, the operator may be able to maintain the desired speed without manually downshifting when machine loading increases.

Conversely, machine 10 may encounter a negative load during travel, such as, for example, when traversing a decline at a worksite. In such situations, it is contemplated that the operator, to a certain extent, may be able to maintain the desired maximum travel speed without manually engaging a brake or downshifting. In one aspect the operator may be able to hold pedal 18a in the desired position (e.g., full 8 mph in speed range "2"), while controller 38 may vary the real-time power source and/or CVT command signals in response to the negative load. For example, sensors 26 and/or 34 may begin to detect a slight increase in machine travel speed in response to the negative load and vary their respective real-time feedback signals accordingly. Controller 38 may then adjust the real-time power source control signal to reduce power source fuel flow, air flow, and/or other parameters to affect a reduction in induced power source output. Controller 38 may also adjust the real-time CVT command signal to affect a decrease in transmission output. As such, traction devices 16 may absorb the negative load by applying it to power source 22 via CVT 24, and an 8 mph maximum travel speed may be maintained, while the operator holds pedal 18a in the fully-depressed position (i.e., "engine braking"). Controller 38 may similarly maintain an intermediate travel speed if the operator holds pedal 18a in an intermediate position. It is to be appreciated that controller 38 may additionally apply braking (while operator holds pedal 18a fully depressed), if necessary, to maintain the maximum machine travel speed when the negative load is too great to be absorbed by power source 22 alone. For example, controller 38 may autonomously affect an increase in fluid flow and/or pressure to service brakes (not shown), engage an engine brake, an exhaust brake, a transmission brake, and/or institute another method of braking known in the art, to supplement the braking discussed above.

INDUSTRIAL APPLICABILITY

The disclosed control system 36 may be applicable to any vehicle or machine having a CVT. Allowing operator selection of discrete speed ranges corresponding to familiar speed ranges of step-changed manual and automatic transmissions may allow operators to feel more comfortable operating the machine. Additionally, the selectable travel speeds may allow the operator to fully depress the accelerator pedal 18a without exceeding a desired maximum speed, saving the operator undue fatigue from holding pedal 18a in an intermediate position in rough terrain. Accordingly, the efficiency benefits of a CVT may be realized without sacrificing operator comfort and familiarity with the earlier transmission types. Several examples of utilizing the selectable ranges will now be provided.

In one embodiment, the operator may toggle between a first state of normal CVT operation and a second state defining the selectable, discrete speed range operation of the disclosed system 36. The first state may cause controller 38 to permit machine travel at any desired speed within the plurality of available discrete machine travel speed ranges (i.e., all possible machine travel speeds). The second state may cause controller 38 to permit machine travel within a selected one of the plurality of available predetermined discrete travel speed ranges. For example, the operator may press a button or flip a switch on interface 18 to toggle between the first and second states. It is to be appreciated that if the first state is selected, controller 38 may, in some cases, "map" pedal 18a such that it covers all speeds provided by the plurality of available discrete machine travel speed ranges, as discussed above.

Figure 4:
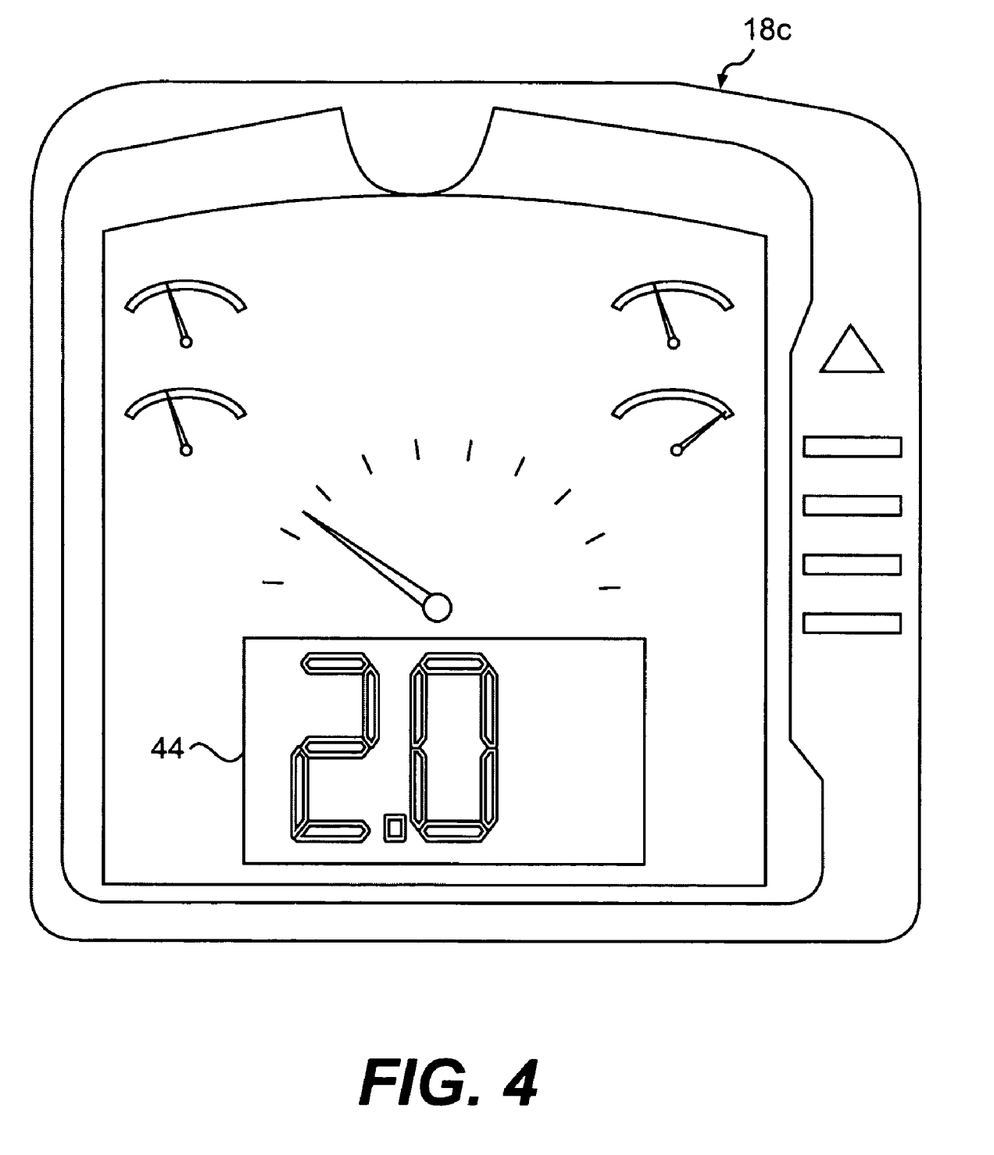
FIG. 4 is an exemplary disclosed monitor for use with the control system of FIG. 3.

Once the second state has been selected, the operator may select a desired speed range from among the plurality of available discrete machine travel speed ranges by way of selector 18b, as discussed above. For example, an operator of machine 10 may wish to travel across a worksite with a full load at a safe and efficient speed. The operator may be aware, from past experience, that third gear in a manual transmission wheel loader offers an appropriate travel speed range for this task. As such, the operator may choose via selector 18b a setting corresponding to speed range "3". As discussed above, selector 18b may communicate a selection signal to controller 38, which may cause a "3" to appear in readout 42 for operator confirmation. Subsequently during travel across the worksite, controller 38 may remap accelerator pedal 18a and limit machine travel speed to between 0 mph and 12 mph, as discussed above.

In another example, the operator may wish to complete a precise material-removal task around a nearby obstacle, such as an above-ground electrical utility. The operator may be aware, from past experience, that it may be difficult to comfortably complete the task, even in first gear, because the travel speed range associated therewith is still too high to perform close-proximity maneuvers without undue risk of striking and damaging the utility. As such, the operator may move selector 18b to a setting corresponding to speed range "0.5". Selector 18b may communicate a selection signal to controller 38, which may cause a "0.5" to appear in readout 42 for operator confirmation. During completion of the task, controller 38 may re-map accelerator pedal 18a and limit machine travel speed to between 0 mph and 2 mph, and the operator may complete the task in a comfortable speed range.

In yet another example, the operator may wish to drive machine 10 from one worksite to another worksite for completion of additional tasks. In one aspect, machine 10 may be required to traverse roads and/or highways in order to reach the second worksite. Based on past experience, the operator may know that fourth gear offers an appropriate speed range to travel on roads with vehicular traffic. As such, the operator may choose via selector 18b a setting corresponding to speed range "4". Selector 18b may communicate a corresponding selection signal to controller 38, which may cause a "4" to appear in readout 42 for operator confirmation. Subsequently during travel to the second worksite, controller 38 may remap accelerator pedal 18a and limit machine travel speed to between 0 mph and 20 mph, as discussed above.

System 36 may allow efficiency benefits of a continuously-variable transmission to be realized without sacrificing operator comfort and familiarity. Particularly, by providing a CVT with selectable speed ranges that correspond to the accustomed speed ranges of conventional transmission types, machine operators may feel comfortable operating the machine due to its similar behavior with respect to travel speed.

It will be apparent to those skilled in the art that various modifications and variations can be made to the disclosed transmission system 36. For example, the disclosed transmission system 36 may be practiced utilizing different machines, power sources, transmissions, speed ranges, maximum and/or minimum speeds, and/or components of system 36; and/or multiple transmissions that may be functionally interrelated to carry out the methods described herein. Other embodiments will be apparent to those skilled in the art from consideration of the specification and practice of the disclosed transmission system 36. It is intended that the specification and examples be considered as exemplary only, with a true scope being indicated by the following claims and their equivalents.

What is claimed is:

1. A transmission control system, comprising:
   a first operator input device to receive operator input and produce a corresponding first signal indicative of a selected one of a plurality of available predetermined discrete machine travel speed ranges;
   a second operator input device to receive operator input and produce a corresponding second signal indicative of desired machine travel;
   a power source operatively coupled to drive a continuously-variable transmission; and
   a controller to regulate at least one of an output of the power source and an output of the continuously variable transmission in response to the first and second signals such that an actual machine travel speed remains within the selected one of the plurality of available predetermined discrete machine travel speed ranges.

2. The control system of claim 1, wherein the controller is further configured to toggle between a first state and a second state in response to operator input, the first state allowing machine travel within a selected one of the plurality of available predetermined discrete machine travel speed ranges, and the second state allowing machine travel at any speed within the plurality of available predetermined discrete machine travel speed ranges.

3. The control system of claim 1, wherein the second operator input device is movable through a displacement range from a minimum position to a maximum position, and the second signal is proportional to a displacement position of the second operator input device.

4. The control system of claim 3, wherein the second operator input device is a foot pedal.

5. The transmission control system of claim 1, wherein the output of the power source includes a speed.

6. The transmission control system of claim 5, wherein the controller regulates an output speed of the power source by adjusting at least one of a fuel flow and an air flow.

7. The transmission control system of claim 1, wherein the output of the power source includes a torque.

8. The transmission control system of claim 1, wherein the output of the continuously variable transmission includes a speed.

9. The transmission control system of claim 8, wherein the controller regulates the speed of the continuously variable transmission by adjusting a torque-to-speed ratio.

10. The transmission control system of claim 1, wherein the controller is further configured to display the selected one of a plurality of predetermined discrete machine travel speed ranges.

11. A method of controlling machine travel speed, comprising:
   transmitting a power output through a continuously variable transmission to propel a machine;
   receiving a first signal indicative of a selected one of a plurality of available predetermined discrete machine travel speed ranges;
   receiving a second signal indicative of desired machine travel; and
   regulating at least one of the power output and an output of the continuously variable transmission in response to the first and second signals such that an actual machine travel speed remains within the selected one of the plurality of available predetermined discrete machine travel speed ranges.

12. The method of claim 11, wherein regulating includes controlling a speed of the power output.

13. The method of claim 11, wherein regulating includes controlling a torque of the power output.

14. The method of claim 11, wherein regulating includes controlling a torque-to-speed output ratio of the continuously variable transmission.

15. The method of claim 11, further including displaying the selected range for operator confirmation.

16. A machine, comprising:
   a power source operatively coupled to drive a continuously-variable transmission;
   a traction device operatively coupled to the transmission to propel the machine;
   an operator station including an operator interface for receiving operator input; and
   a controller configured to:
      receive a first signal from the operator interface indicative of a selected one of a plurality of available predetermined discrete machine travel speed ranges;
      receive a second signal from the operator interface indicative of desired machine travel; and
      regulate at least one of an output of the power source and an output of the continuously variable transmission in response to the first and second signals such that an actual machine travel speed remains within the selected one of the plurality of predetermined discrete machine travel speed ranges.

17. The machine of claim 16, wherein the operator interface includes an input device movable through a displacement range from a minimum position to a maximum position, and the second signal is proportional to a displacement position of the input device.

18. The machine of claim 16, wherein the output of the continuously variable transmission includes a speed.

19. The machine of claim 18, wherein the controller regulates the speed of the continuously variable transmission by adjusting a torque-to-speed ratio.

20. The machine of claim 16, wherein the controller is further configured to display the selected one of a plurality of predetermined discrete travel speed ranges.

* * * * *